J. G. TALMAGE.
DISCHARGE CONTROLLER FOR ASH PANS.
APPLICATION FILED JUNE 17, 1909.

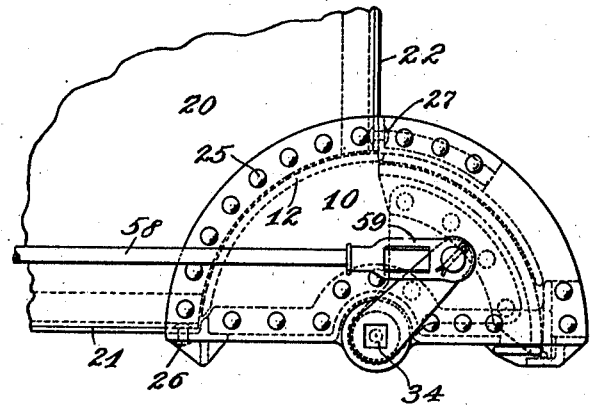
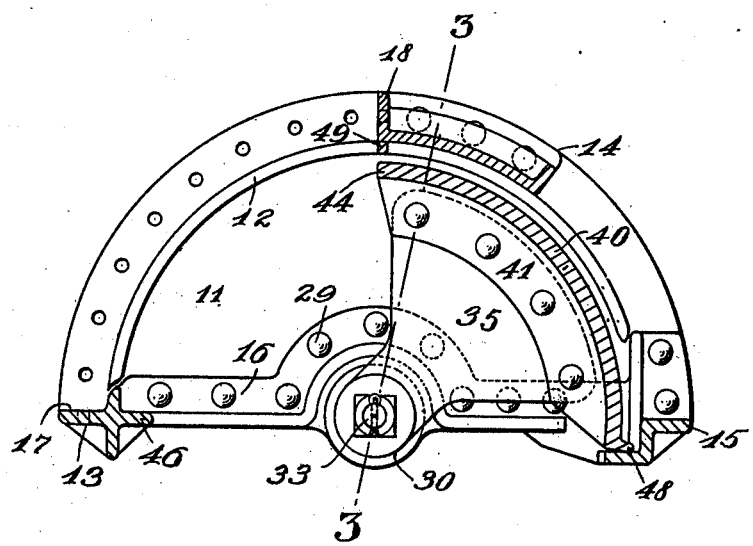

978,074.

Patented Dec. 6, 1910.

2 SHEETS—SHEET 2.

WITNESSES:

INVENTOR
John G. Talmage,
BY
ATTORNEY

UNITED STATES PATENT OFFICE.

JOHN G. TALMAGE, OF CLEVELAND, OHIO.

DISCHARGE-CONTROLLER FOR ASH-PANS.

978,074.  Specification of Letters Patent.  Patented Dec. 6, 1910.

Application filed June 17, 1909. Serial No. 502,659.

*To all whom it may concern:*

Be it known that I, JOHN G. TALMAGE, a citizen of the United States, residing at Cleveland, in the county of Cuyahoga and State of Ohio, have invented a certain new and useful Improvement in Discharge-Controllers for Ash-Pans, of which the following is a full, clear, and exact description, reference being had to the accompanying drawings.

The object of this invention is to provide a very simple and effective mechanism for controlling the discharge from a locomotive ash pan.

Application No. 471,913 of Theodore H. Curtis shows and claims a system of discharging ashes from locomotive ash pans comprising means for projecting streams of water along the pan to force the ashes out through an opening, the gate for which, when swung, forms a deflector to downwardly discharge ashes.

The present invention is an improvement on the mechanism shown in the Curtis application referred to and comprises broadly a rocking segmental member, which may close the exit from the ash pan or be swung about the center of curvature to not only open the pan but at the same time provide a downward deflector.

My mechanism is extremely simple in construction and is adapted for application to existing ash pans. It is adapted for embodiment in a self-contained and removable attachment, and this feature is also of my invention.

The drawings clearly disclose my invention embodied in a self-contained attachment.

Figure 3:
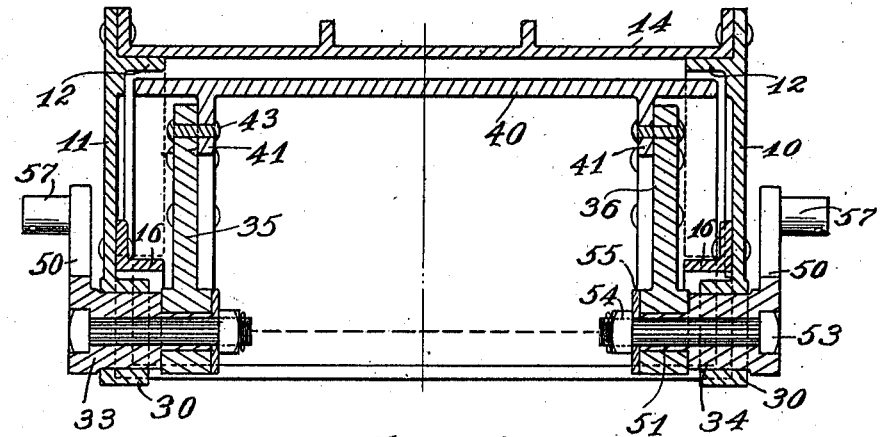
Figure 4:
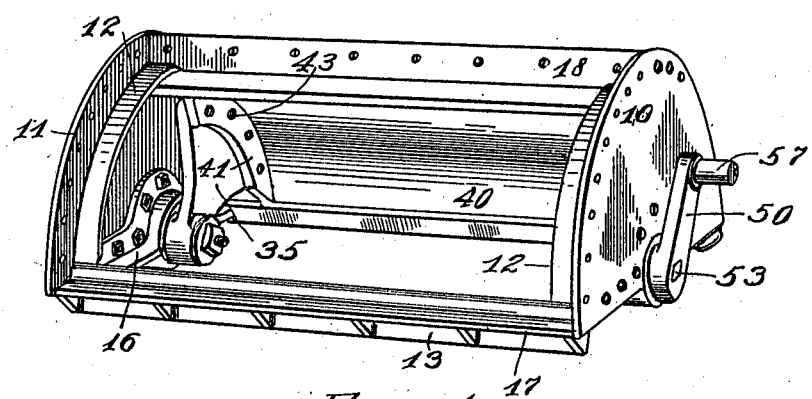

Figure 1 is the side elevation of my discharge controller and the adjacent portion of the ash pan to which it is attached. Fig. 2 is a vertical section through the discharge controller in a plane parallel with Fig. 1. Fig. 3 is a transverse section substantially as indicated by the line 3—3 of Fig. 2. Fig. 4 is a perspective view of my mechanism assembled and ready for attachment to an ash pan.

As shown in the drawings, the frame of my attachment comprises end plates 10 and 11, which are formed with inwardly projecting flanges 12, and cross members designated 13, 14 and 15. These cross members are suitably ribbed to give them the desired strength and stiffness and are riveted or bolted to the end members as shown.

The portion of the ash pan shown in Fig. 1 is of a common type and comprises side sheets 20, a bottom 21 and end 22. My attachment is of such size with reference to the ash pan that the side sheets extend snugly between the end plates 10 and 11 and rest on the flanges 12 while the bottom sheet 21 rests on the flange 17 of the cross member 13 and the end sheet 22 rests against the flange 18 of the cross member 14. The various sheets of the ash pan are bolted or riveted to the respective members against which they bear; thus Fig. 1 shows rivets 25 connecting the sheet 20 of the end 10; rivets 26 connecting the bottom with the web 17, and rivets 27 connecting the end with the cross member 14. The cross members 13 and 15 as shown, are connected together by two lateral braces 16, these braces and the two cross members being preferably made in one integral frame like casing, which is connected to the end plates by the rivets 29.

Mounted in eyes 30 formed on the end plates 10 and 11 are suitable studs 33 and 34. On these studs on the inner side of the end plates are arms 35 and 36 which are secured near their outer ends to webs 41 projecting inwardly from the curved plate 40. This plate is preferably substantially a quarter of the cylinder and may conveniently be a casting, the webs being integral with it, which webs are shown as secured to the arms by rivets 43. The outer and inner surfaces of the plate 40 being composed of arcs about the axis of the studs, and it will be seen that the gate thus provided is adapted to be swung about such axis either to open the ash pan as shown in Figs. 1 and 2, or to close it, the outer surface of the gate lying comparatively close to the inner surface of the flanges 12. When closed, the edge 44 of the gate rests against the flange 46 of the cross member 13, while the flange 48 on the other edge of the gate comes just behind the depending flange 49 on the cross member 14. Accordingly when the gate is closed, a sufficiently tight connection is made to prevent leakage of ashes, while when the gate is opened, as shown in Fig. 2, the inner surface of the gate provides a deflector to effect the downward discharge of the material.

To enable the gate to be conveniently swung from either extreme position to the other I arrange the following mechanism. The studs 33 and 34 to which the arms 35 and 36 are secured are, in the form shown, hubs of cranks 50. These hubs are journaled in the eyes 30 and have reduced extensions 51 on which the arms seat. The arms are rigidly clamped to the hubs by bolts 52 which occupy axial openings in the hubs and clamp the arms against the shoulders resulting from the reduced extensions 51. As shown, heads 53 of the bolts occupy correspondingly shaped recesses in the cranks, and nuts 54 and washers 55 on the bolts bear against the arms with clamping effect.

Any suitable means may be applied to the crank pins 57 to swing the gate. Fig. 1 shows a link 58 for this purpose which carries at its end an eye piece 59 journaled on the crank pin. It will be apparent that if the link 58 be drawn toward the left the gate will be swung over into position to close the ash pan, while a reverse movement will restore the gate to the position shown.

My gate is not only simple in construction and easily applied, but it performs the double function of closing the opening in the ash pan and of forming a deflector insuring a downward discharge when the ash pan is open. This downward discharge, effected by the inner surface of the gate, is one of the vital features of my invention. Without it, the ashes which are blown toward the gate with very considerable force, would pass onto the machinery of the locomotive causing dirt and damage and rendering the operation very unsatisfactory.

Having thus described my invention, what I claim is:

1. The combination, with an ash pan, of a segmental gate therefor mounted to swing on a pivot into two extreme positions in one of which the convex surface forms a closure for the pan and in the other of which the concave surface forms a downward deflector for the discharging ashes.

2. The combination, with an ash pan having a horizontal bottom and a vertical end wall, of a segmental gate pivoted substantially at the junction of the planes of the end wall and bottom and having a quadrant surface adapted to occupy either of two extreme positions substantially ninety degrees apart, the gate at its innermost position closing the opening between the end wall and bottom, and the gate at its outermost position providing a curved downward deflector in the path of the discharging ashes.

3. The combination of a locomotive ash pan, a pair of semi-circular extensions for the side walls thereof, a segmental gate pivoted at the center of its curvature between such extensions, the convex surface of the gate being adjacent the ashes when the gate is in the closed position and the concave surface being in the path of the discharging ashes when the gate is in the open position, and suitable flange members between said extensions enabling the gate to make a tight closure when closed.

4. The combination, with a locomotive ash pan, of a pair of extensions for its side walls, three cross members between the same, one of which cross members engages the bottom of the pan and another the end thereof, a segmental gate pivotally mounted between said extensions and having a flange coöperating when the gate is closed with the cross member which is secured to the pan end, the third cross member mentioned engaging and supporting the outer edge of the gate when it is open.

5. The combination, with an ash pan, of a segmental gate for closing the same and comprising a quadrant pivoted at substantially the junction of the planes of the end wall and bottom of the pan, means adapted to engage the gate for holding it with its convex surface against the pan contents to close the pan, and means for holding the gate in open position after it has turned substantially ninety degrees from its closed position, whereby, in the open position, the concave surface of the gate presents a downward deflector in the path of the discharging ashes.

In testimony whereof, I hereunto affix my signature in the presence of two witnesses.

JOHN G. TALMAGE.

Witnesses:
 ALBERT H. BATES,
 A. J. HUDSON.